(12) United States Patent
Gelfenbeyn et al.

(10) Patent No.: US 9,380,017 B2
(45) Date of Patent: Jun. 28, 2016

(54) HUMAN ASSISTED CHAT INFORMATION SYSTEM

(71) Applicants:Ilya Gelfenbeyn, Sunnyvale, CA (US);
Artem Goncharuk, Arlington, VA (US);
Pavel Sirotin, Moscow (RU)

(72) Inventors: Ilya Gelfenbeyn, Sunnyvale, CA (US);
Artem Goncharuk, Arlington, VA (US);
Pavel Sirotin, Moscow (RU)

(73) Assignee: Speaktoit, Inc., Palo Alto, CA (US)

( * ) Notice: Subject to any disclaimer, the term of this patent is extended or adjusted under 35 U.S.C. 154(b) by 292 days.

(21) Appl. No.: 14/074,032

(22) Filed: Nov. 7, 2013

(65) Prior Publication Data

US 2014/0129651 A1 May 8, 2014

Related U.S. Application Data

(60) Provisional application No. 61/723,783, filed on Nov. 8, 2012.

(51) Int. Cl.
*H04L 12/58* (2006.01)
(52) U.S. Cl.
CPC .............. *H04L 51/32* (2013.01); *H04L 51/046* (2013.01)

(58) Field of Classification Search
CPC ........................................................ H04L 51/04
USPC .......................................................... 709/226
See application file for complete search history.

(56) References Cited

U.S. PATENT DOCUMENTS

2011/0238763 A1* 9/2011 Shin ........................ G06Q 10/10
709/206
2012/0150973 A1* 6/2012 Barak ................ G06Q 30/0609
709/206

* cited by examiner

*Primary Examiner* — David Lazaro
*Assistant Examiner* — Zia Khurshid
(74) *Attorney, Agent, or Firm* — Georgly L. Khayet (57) ABSTRACT

Disclosed is a technology for providing information to users of a chat information system. The chat information system may receive an information request from a user. The information request may be processed to determine its subject area and forwarded to information sources or external communication services, such as social networks, forums, and the like. Answers received from the information sources and external communication services may be validated and selected based on user feedbacks and ratings. The selected answers may be then delivered to the users of the chat information system. After receiving the answers, the user may evaluate them to be further stored for future use by the chat information system.

20 Claims, 5 Drawing Sheets

FIG. 5

HUMAN ASSISTED CHAT INFORMATION SYSTEM

RELATED APPLICATIONS

The present application claims benefit of priority under 35 U.S.C. of U.S. Provisional Application Ser. No. 61/723,783, filed Nov. 8, 2012, which is incorporated hereby by reference in its entirety for all purposes.

TECHNICAL FIELD

This disclosure relates generally to data processing and, more specifically, to human-assisted chat information systems.

BACKGROUND

Conventional chat information systems interacting with users in natural language, such as talking personal assistants for mobile phones, typically get information from their own knowledge databases or external communication services, such as search engines, databases, expert systems, and others. With the continued growth of social networks and human interactions with the chat information systems, it becomes possible to direct some user requests to other users interacting with the chat information systems or users whom the chat information systems can reach via external communication services. For example, the chat information systems can reach users of social networks via social network user interfaces. Therefore, there is a need for methods of getting information from people that the chat information system can reach via different channels including external communication services, such as social networks, forums, dedicated question answering services, and others.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The approaches of the present disclosure provide for interactively delivering information to users of a chat information system (CIS) by interacting with users that may be reached via different channels including external communication services, such as social networks, forums, dedicated question answering services, and others.

According to an aspect of the present disclosure, a method is provided for providing information to a user of a chat information system. The method may comprise receiving, by a processor, an information request from the user of the chat information system. The method may further include determining, by the processor, a subject area associated with the information request. The method may further include the processor forwarding, based on the processing, the information request to one or more information resources. The method may further include selecting, by the processor, one or more answers from answers received from the one or more information resources. The method may further include delivering, by the processor, the selected one or more answers to the user of the chat information system.

In certain embodiments, the method may further comprise forwarding the information request to further users of the chat information system.

In certain embodiments, the method may further comprise forwarding the information request to one or more external communication services.

In certain embodiments, the one or more external communication services include one or more of the following: a website, a web blog, a social network, a specialized information request answering service, a forum, a chat room, an email system, a group discount service system, and a crowd-sourced system.

In certain embodiments, the method may further include requesting user permission from the user to forward the information request to the one or more external communication services.

In certain embodiments, the method may further include receiving a notification indicative of availability of one or more answers in the one or more external communication services.

In certain embodiments, the one or more answers are delivered in an asynchronous manner by one or more of the following: a push notification, an email, a text message, an instant message, a blog post, a social network message, and a voice message.

In certain embodiments, the one or more information sources include one or more of the following: a search engine, an online encyclopedia, an expert system, an online library, a knowledge database, an image database, multimedia, a statistical database, an electronic journal, and a map database.

In certain embodiments, the method may further comprise determining, based on the subject area associated with the information request, one or more target users of the chat information system or external communication services to whom the information request may be forwarded.

In certain embodiments, the selection of the one or more answers is based on one or more of the following: a user feedback, a user rating, an answer rating, user profile information, a user expertise, and an inner rating within the chat information system.

According to an aspect of the present disclosure, a chat information system is provided. The system may comprise a database in communication with a processor configured to implement the method step according to the present disclosure.

In further example embodiments of the present disclosure, the method steps are stored on a machine-readable medium comprising instructions, which when implemented by one or more processors perform the recited steps. In yet further example embodiments, hardware systems or devices can be adapted to perform the recited steps. Other features, examples, and embodiments are described below.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium such as a disk drive, or computer-readable medium. It should be noted that methods disclosed herein can be implemented by a computer (e.g., a desktop computer, tablet computer, laptop computer), game console, handheld gaming device, cellular phone, smart phone, smart television system, and so forth.

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments.

A chat information system is a computer-based agent having a human-centric interface for accessing and managing information. Traditionally, a chat information system may interact with users in natural language to simulate an intelligent conversation and provide personalized assistance to the users. For example, the users may ask the chat information system questions such as "Where is the nearest hotel?" or "What is the current weather?" and receive appropriate answers. The users may also provide voice commands to the chat information system to perform certain functions including, for example, generating emails, making phone calls, searching for information, acquiring data, re-addressing user requests, guiding users, providing notifications and reminders, and so forth. The chat information system and personal digital assistant system are widely used and assist users of computers and, especially, holders of portable electronic devices such as smart phones, cellular phones, tablet computers, gaming consoles, and so forth.

The term "chat information system," or CIS, may also be known as "spoken dialog system," "dialog system," "conversational agent," "chatter robot," "chatterbot," "chatbot," "chat agent," "digital personal assistant/agent," "automated online assistant," and so forth. All these terms are within the scope of the present disclosure and referred to as "chat information system" or "CIS" for simplicity.

Essentially, the chat information system users may ask a great number of various questions and request a wide range of information. The users typically request similar or the same information on a daily basis, which may include, for example, weather reports, traffic reports, local or global news, information related to scheduled meetings or appointments, evening events in a target city, navigational information, and so forth. Additionally, the users, when required to gather information from multiple sources on a daily basis, may simply forget to request certain information items, which may lead to unwanted consequences including missed meetings or events, missed deadlines, ignorance of important information, and so forth. Therefore, there is still a need for development of CIS and, in particular, there is a need for improvement of human-CIS interaction interface.

The embodiments of the present disclosure refer to a computer-based chat information system that allows getting information from users interacting with the chat information system and other external communication services and systems, such as social networks, via different channels, and methods of validating, evaluating, storing, and delivering this information to users of the chat information system.

The user may interact with the chat information system utilizing a user device selected from a wide range of electronic devices including, for example, a computer (desktop computer, laptop computer, tablet computer), smart phone, cellular phone, game console, game pad, remote controller, television device, smart (Internet) television device, audio system, in-vehicle computer system, infotainment system, or any other suitable electronic device. The interaction with the chat information system may include speech commands, although key input commands, selection of actionable (clickable) messages, or gesture-based commands are also possible. As described below in greater detail, the chat information system may refer to a software application installed on the user device, a server, or a remote device, or it may refer to a distributed application or a cloud-based service.

Figure 1:
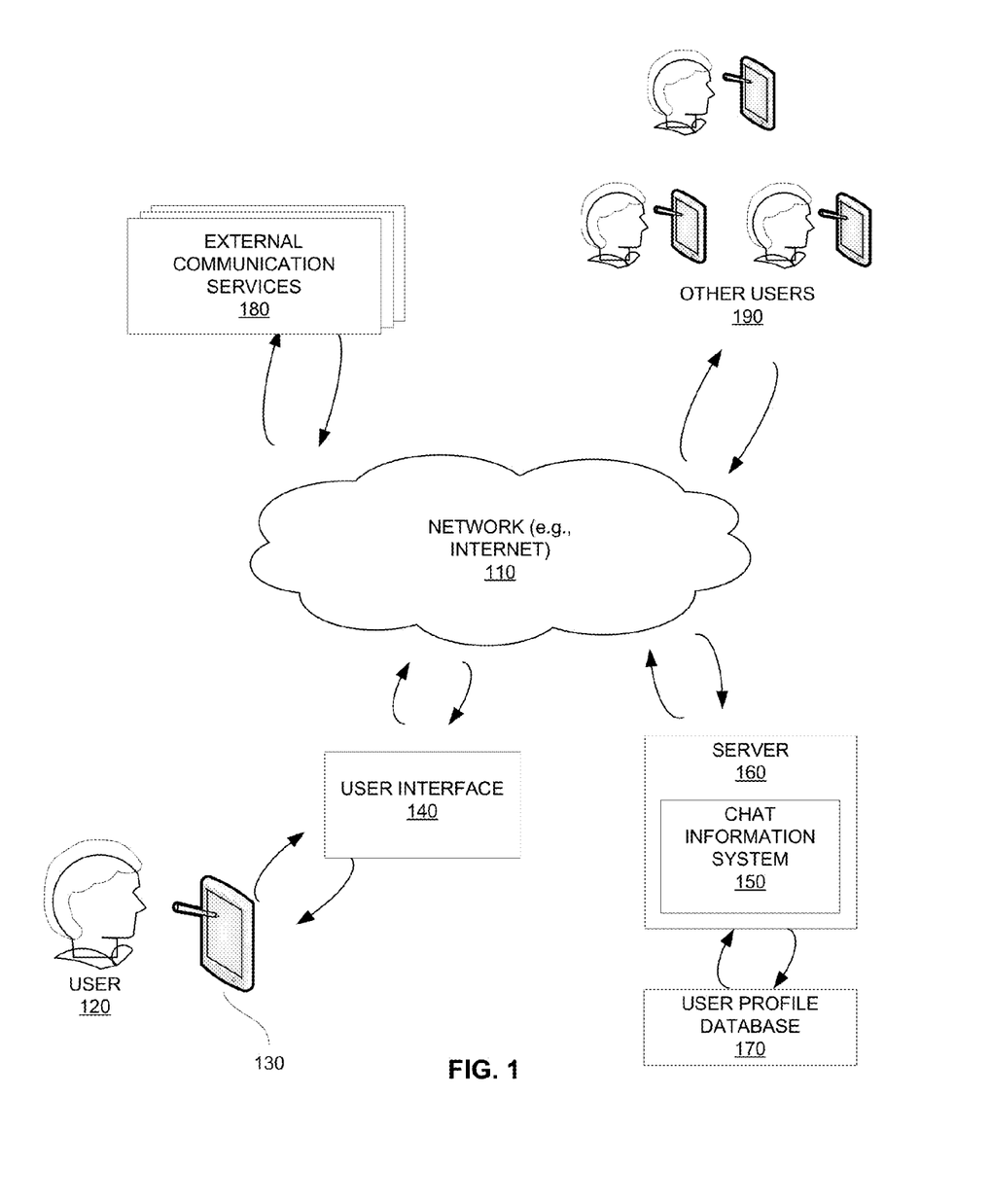
FIG. 1 illustrates a block diagram showing a sample environment within which methods and systems for providing information to a user of a chat information system may be implemented, in accordance with an example embodiment.

FIG. 1 illustrates a block diagram showing a sample environment 100 within which methods and systems for providing information to a user of a chat information system may be implemented, in accordance with an example embodiment.

As shown in this figure, a user 120 may interact with a chat information system 150 by providing a user input in natural language via a user device 130. The user input may be in the form of a typed text or a speech (audio). The user input may refer to an information request (a question), such as "What is the current weather?" or the like. In certain embodiments, the chat information system 150 may comprise a user profile database 170 configured to store user preferences and user-specific information, such as history of user requests.

In certain embodiments, words, phrases, and sentences typed in natural language may be analyzed by a natural language processing (NLP) module of the chat information system 150 (e.g., morphological analysis, part-of-speech tagging, or shallow parsing may be performed). User speech input may be processed by an automatic speech recognizer (ASR) of the chat information system 150 to translate natural language into text, which is referred to herein as a recognized input. The recognized input is then analyzed by the NLP module. The NLP module may also map the recognized input or its parts to one or more meaning representations (e.g., semantic frame) from which the dialog act, user goal, and named entities are extracted by a semantic parser or statistical model.

It should be noted that every module of the chat information system 150 may include hardware components, software components, or a combination thereof. The chat information system 150 may be embedded in the user device 130 or server 160, or may be presented as a cloud computing module and/or a distributed computing module.

The server 160 may be connected to one or more external communication services 180 via a communication network 110. The communication network 110 may include a wireless or wire network, or a combination thereof. For example, the network 110 may include one or more of the following: the Internet, local intranet, PAN (Personal Area Network), LAN (Local Area Network), WAN (Wide Area Network), MAN (Metropolitan Area Network), virtual private network (VPN), storage area network (SAN), frame relay connection, Advanced Intelligent Network (AIN) connection, synchronous optical network (SONET) connection, digital T1, T3, E1 or E3 line, Digital Data Service (DDS) connection, DSL (Digital Subscriber Line) connection, Ethernet connection, ISDN (Integrated Services Digital Network) line, cable modem, ATM (Asynchronous Transfer Mode) connection, or an FDDI (Fiber Distributed Data Interface) or CDDI (Copper Distributed Data Interface) connection. Furthermore, communications may also include links to any of a variety of wireless networks including, GPRS (General Packet Radio Service), GSM (Global System for Mobile Communication), CDMA (Code Division Multiple Access) or TDMA (Time Division Multiple Access), cellular phone networks, GPS, CDPD (cellular digital packet data), RIM (Research in Motion, Limited) duplex paging network, Bluetooth radio, or an IEEE 802.11-based radio frequency network.

In various embodiments, the one or more external communication services 180 may include one or more of the following: websites, web blogs, social networks, specialized question answering services, forums, email systems, calendar systems, group discount service systems, online encyclopedias, crowd-sourced systems, Internet search engines, forums, chat rooms, databases, data storage resources, data aggregators, file sharing websites, micro-blogging websites, and so forth. The chat information system 150 and the user device 130 may be configured to operatively communicate with these or similar external communication services to retrieve information requested by the user 120.

According to various embodiments, the user device 130 may include a computer (e.g., a desktop computer, laptop computer, tablet computer), smart phone, wireless telephone, cellular phone, television system, remote controller, gaming console, gaming pad, in-vehicle computer, infotainment system, smart-home computer, and any other electronic device having at least one processing or computational unit. The user device 130 should be configured to receive user input. Furthermore, the user device 130 may run dedicated software allowing it to practice the principles of the present disclosure. In an example, the user device 130 may run a browser allowing the user to visit a dedicated webpage or access a specific web service which employs at least some functionality of the chat information system 150. In another example, the user device 130 may run a dedicated mobile application enabling communication with the chat information system 150. It should be understood that the chat information system 150 may be run on the user device 130 or a networked server 160, or may constitute distributed software application(s) running on both the user device 130 and a network server 160 or on a plurality of networked servers (e.g., be a cloud-based embodiment).

The user 120 may interact with the chat information system 150 via a user interface 140. After receiving a user request, the chat information system 150 may determine whether the user request should be processed by working with default information sources or contacting other users 190 via external communication services 180, such as social networks, question answering services, and the like. When other users answer the user request, answers may be validated and/or selected based on a predetermined criteria (user feedbacks or ratings). After the chat information system 150 processes the answers, one or more selected answers may be provided to the user 120 asynchronously as an output in the form of a push notification, an email, a text message, an instant message, a blog post, a social networking site message, a voice message, and the like.

Figure 2:
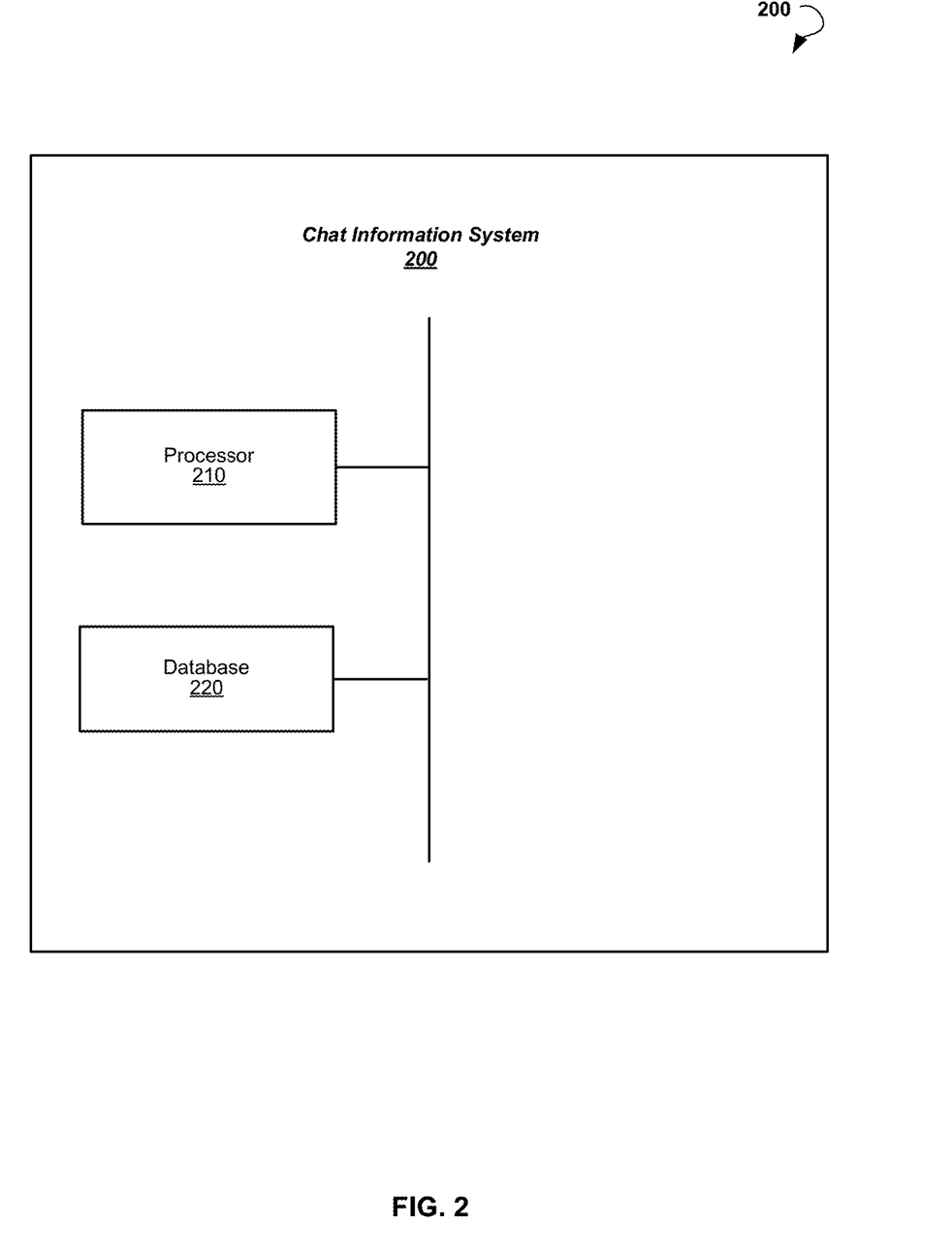
FIG. 2 illustrates a block diagram illustrating a sample system for providing information to a user of a chat information system, in accordance with an example embodiment.

FIG. 2 illustrates a block diagram illustrating a sample system 200 for providing information to a user of a chat information system, in accordance with an example embodiment. The sample system 200 may comprise a processor 210 configured to receive an information request, from the user of the chat information system, determine a subject area associated with the information request, and based on the determination, forward the information request to one or more information resources. The processor 210 may be further configured to select one or more answers from answers received from the one or more information sources and deliver the selected one or more answers to the user of the chat information system.

The system 200 may also comprise a database 220 configured to store user profile information, user preferences, user expertise, user rating, history of user requests and corresponding answers, and the like information.

Figure 3:
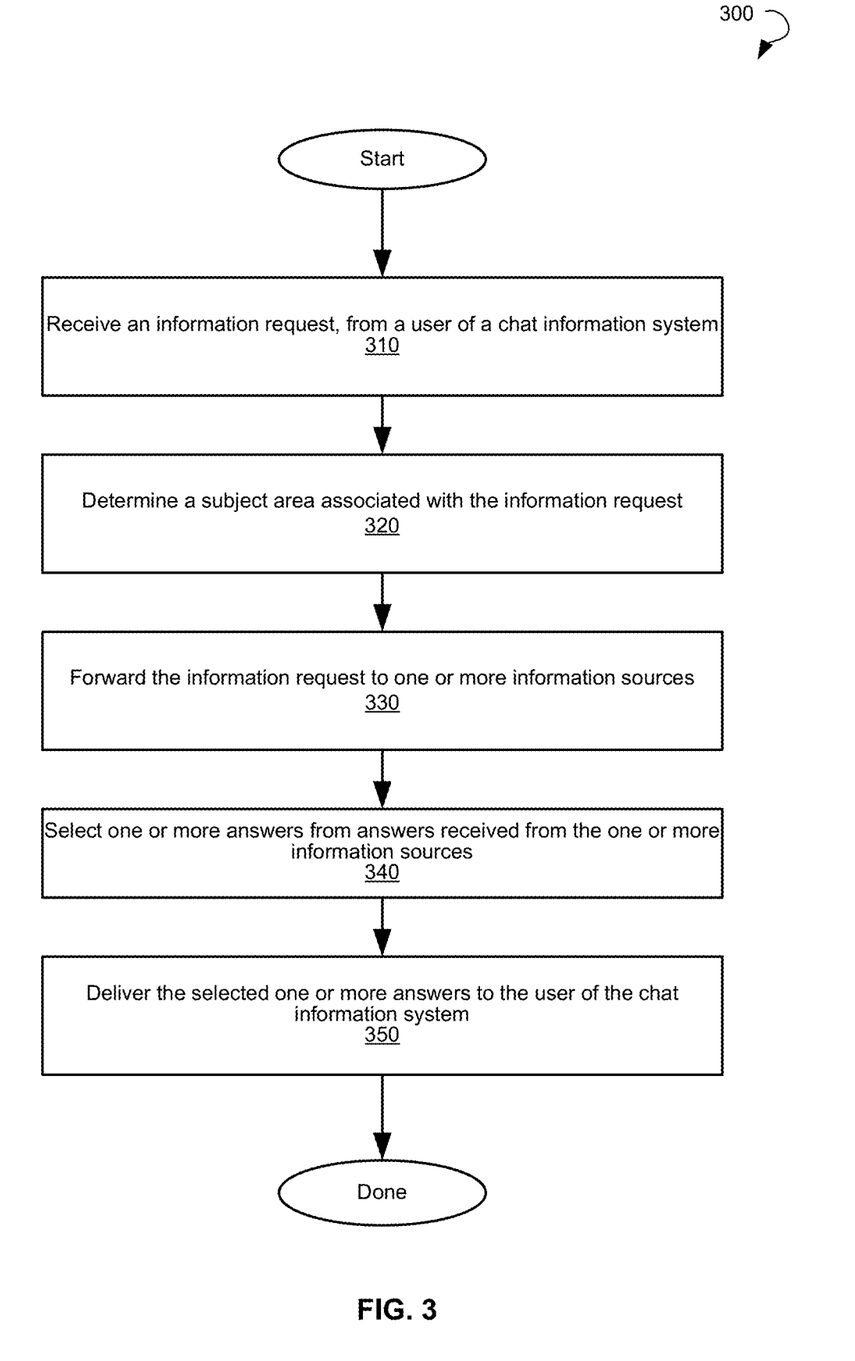
FIG. 3 illustrates a flow chart showing a method for providing information to a user of a chat information system, in accordance with an example embodiment.

FIG. 3 illustrates a flow chart showing a method 300 for providing information to a user of a chat information system, in accordance with an example embodiment.

The method 300 may commence with receiving, by a processor, an information request, from the user of the chat information system, at operation 310. At operation 320, a subject area associated with the information request may be determined. Based on the determination, the information request may be forwarded to one or more information sources, at operation 330. In certain embodiments, the information request may be forwarded to other users of the chat information system. The chat information system may also select one or more target users to be forwarded the information request. The selection may be based on the subject area of the information request, user expertise, user rating, and so forth.

In certain embodiments, the information request may be forwarded to one or more external communication services. The chat information system may periodically check the one or more external communication services for the availability of answers to the user information request. Alternatively, the chat information system may receive a notification about the availability of the one or more answers posted on the one or more external communication services.

The method 300 may further proceed with selecting one or more answers from answers received from the one or more information sources, at operation 340. The selection of the one or more answers may be based on user feedbacks, user ratings, answer ratings, user profile information, user expertise, and inner ratings within the chat information system, and so forth.

Finally, at operation 350, the selected one or more answers may be delivered to the user of the chat information system in an asynchronous manner. The one or more answers may be delivered to the user via push notifications, emails, text messages, instant messages, blog posts, social networking site messages, voice messages, and so forth.

Figure 4:
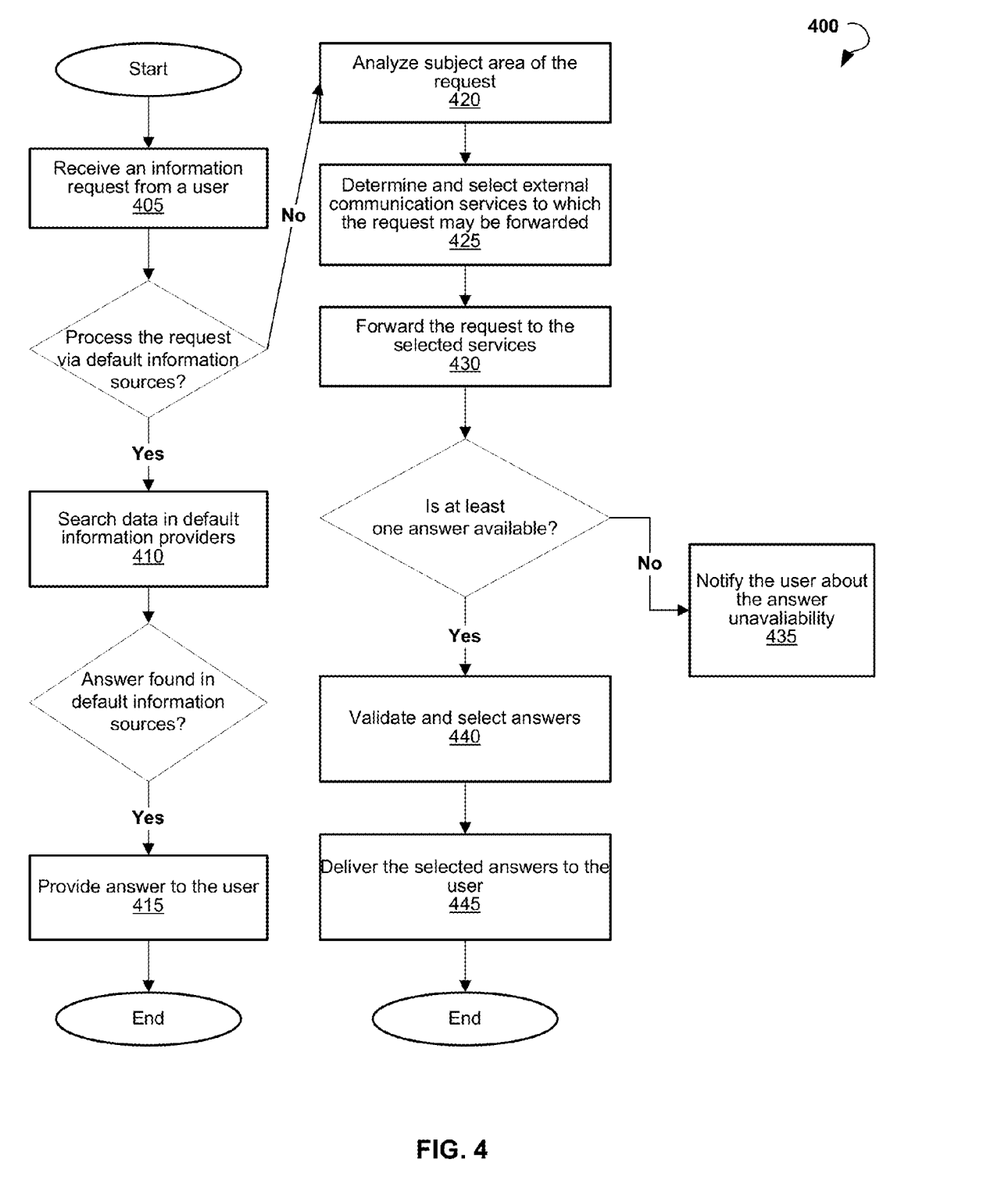
FIG. 4 illustrates a flow chart showing a specific example of a method for providing information to a user of a chat information system, in accordance with an example embodiment.

FIG. 4 illustrates a flow chart showing a specific example of a method 400 for providing information to a user of a chat information system, in accordance with an example embodiment.

The method 400 may commence at a chat information system receiving an information request from a user, at operation 405. The chat information system may decide whether the information request should be processed by working with default information sources or contacting other people via external communication services, such as social networks, question answering services, forums, and the like. The decision may be based on the analysis of the user information request and user preferences. For example, a user of the chat information system may want to obtain a list of modern American fiction writers. The system intelligence may determine that such information relates to general knowledge and may be retrieved from default information sources, such as an online encyclopedia. Thus, at operation 410, the chat information system may search for this information in default information sources. At operation 415, the retrieved information about modern American fiction writers may be provided to the user.

In certain embodiments, the user may ask a generic question, but the answer cannot be found using the default information sources, such as search engines, encyclopedias, or expert systems. In this case, the request may be addressed to other people, including other users of the chat information system or users of external communication services after trying to process it automatically. For example, a user asks for a recommendation of a good book to read. Because the answer is not universal and may depend on information about user preferences, the chat information system may decide that this request should not be sent to a search engine or online encyclopedia, but rather to contacts of this user in a social network, because they may know better what to recommend to this user.

In order to process the user request effectively, the chat information system may, at operation 420, analyze it and determine the topic of the request, the subject areas to which the request is related, and other information that can help route the request.

At operation 425, the chat information system may determine and select one or more external communication services to which the question may be forwarded. Depending on the request content and user preferences, the user request may be forwarded to users of the one or more external communication services. The external communication services may include external communication services, such as social networks, specialized question answering services, and/or the like. In certain embodiments, the user request may be forwarded to other users of the chat information system via a chat information system software client, such as a mobile application. Also, based on the information about the request and user preferences, the system may define the audience (experts) that should be targeted in each external communication service. For example, the question about a book to read may be addressed to all user contacts in a social network, and a question related to a programming language may be forwarded to other chat information system users who are experienced in programming languages.

In certain embodiments, user permission may be required before forwarding the question to other people. The chat information system may ask for permission for each of such questions or just once.

At operation 430, the question may be forwarded to the selected external communication services (for example a social networking service). The chat information system may post a question on behalf of the user and gather answers provided by user contacts in the social network or other social network users. If the request is forwarded to other chat information system users, they may get a notification about the question asked and an invitation to answer this question. If the request is forwarded to a specialized question answering service, the system may post a question on its own behalf or on behalf of the user.

After posting the question, the chat information system checks if people in the selected external communication services answered it. Alternatively, external communication services may notify the chat information system about the availability of the answers. When people have answered the request, the answers may be validated and/or selected, at operation 440. If the question was posted via a social network or specialized question answering service, the chat information system may select better answers based on other users' feedback and ratings (such as a number of times a "Like" button was pressed or other types of answer ratings). In order to validate the answers, the answers can be sent to other users of the chat information system who opted in to participate in validation. Such users may be selected based on their user profile information, preferences, and expertise.

When the answers are selected and validated, the user may be notified by the chat information system (for example by a "push notification" in a mobile application) and, at operation 445, the answers may be delivered to the user by email or by other channels, such as a push notification, a text message, an instant message, a blog post, a social networking site message, a voice message, and so forth.

In certain embodiments, some questions may have an expiration time limitation tied to them. If no suitable answer is obtained (for example, because nobody has answered the question or because none of the replies passed the verification step), the user may be notified by the chat information system about the answer unavailability, at operation 435.

In certain embodiments, after receiving the answer, the user may be asked to evaluate it. Based on this evaluation, the request and answer pair may be stored for future use by the chat information system. Users who provided the answers may get their expertise evaluated, which may affect the likeliness of them getting such requests in the future.

Figure 5:
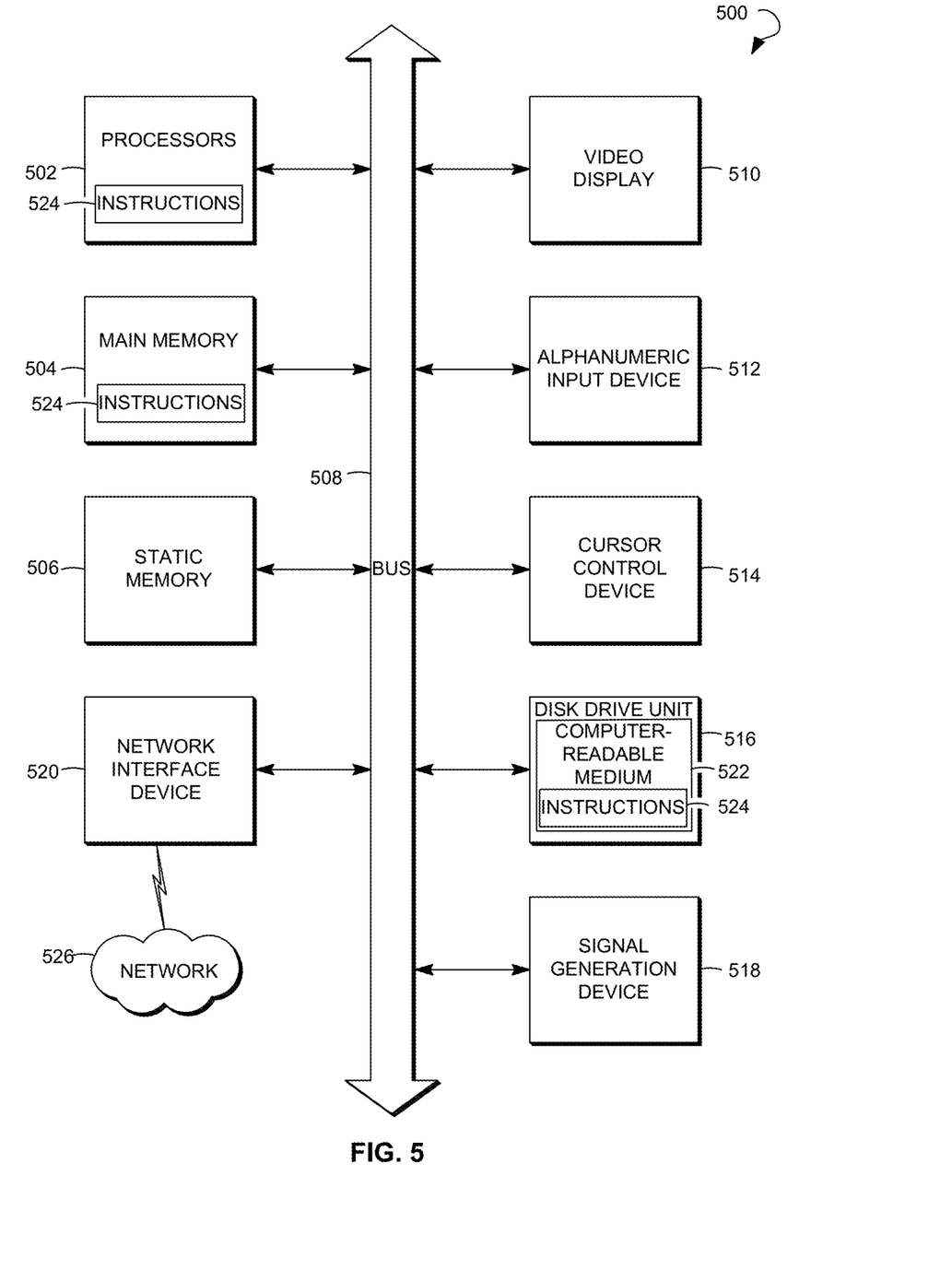
FIG. 5 illustrates a diagrammatic representation of an example machine in the form of a computer system within which a set of instructions for causing the machine to perform any one or more of the methodologies discussed herein is executed.

FIG. 5 illustrates a diagrammatic representation of an example machine in the form of a computer system within which a set of instructions for causing the machine to perform any one or more of the methodologies discussed herein is executed. A computer system 500 may include a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a tablet computer, a cellular telephone, a smartphone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor or multiple processors 502 (e.g., a central processing unit (CPU), a graphics processing unit (GPU), or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 may also include an alphanumeric input device 512 (e.g., a keyboard), a cursor control device 514 (e.g., a mouse), a disk drive unit 516, a signal generation device 518 (e.g., a speaker), and a network interface device 520.

The disk drive unit 516 includes a computer-readable medium 522, on which is stored one or more sets of instructions and data structures (e.g., instructions 524) embodying or utilized by any one or more of the methodologies or functions described herein. The instructions 524 may also reside, completely or at least partially, within the main memory 504 and/or within the processors 502 during execution thereof by the computer system 500. The main memory 504 and the processors 502 may also constitute machine-readable media.

The instructions 524 may further be transmitted or received over a network 526 via the network interface device 520 utilizing any one of a number of well-known transfer protocols (e.g., Hyper Text Transfer Protocol (HTTP)).

While the computer-readable medium 522 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks (DVDs), random access memory (RAM), read only memory (ROM), and the like.

The example embodiments described herein may be implemented in an operating environment comprising software installed on a computer, in hardware, or in a combination of software and hardware.

Thus, a human-assisted chat information system has been described. Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

The invention claimed is:

1. A computer-implemented method for providing information to a user of an automated dialog system employing a natural language processing (NLP) module, the method comprising:
    receiving, by a processor, an information request, from the user of the automated dialog system;
    processing the information request by the NLP module to provide a meaning representation of the information request;
    determining, by the processor, if the information request should be processed by default information sources or non-default information sources;
    if it is determined that the information request should be processed by the default information sources:
        searching for an answer, by the processor in at least one predetermined default information source based on the a meaning representation of the information request; and
        delivering, by the processor, the answer obtained from the at least one predetermined default information source to the user;
    if it is determined that the information request should be processed by the non-default information sources:
        determining, by the processor, a subject area associated with the information request based on the meaning representation of the information request;
        based on the determination, forwarding, by the processor, the information request to one or more information sources;
        selecting, by the processor, one or more answers from answers received from the one or more information sources, wherein the selection of the one or more answers is based on the subject area associated with the information request; and
        delivering, by the processor, the selected one or more answers to the user.

2. The method of claim 1, further comprising forwarding the information request to further users of the automated dialog system.

3. The method of claim 1, further comprising forwarding the information request to one or more external communication services.

4. The method of claim 3, wherein the one or more external communication services include one or more of the following: a website, a web blog, a social network, a specialized information request answering service, a forum, a chat room, an email system, a group discount service system, and a crowd-sourced system.

5. The method of claim 3, further comprising requesting user permission from the user to forward the information request to the one or more external communication services.

6. The method of claim 3, further comprising receiving a notification indicative of availability of one or more answers in the one or more external communication services.

7. The method of claim 1, wherein the one or more answers are delivered in an asynchronous manner by one or more of the following: a push notification, an email, a text message, an instant message, a blog post, a social network message, and a voice message.

8. The method of claim 1, wherein the one or more information sources include one or more of the following: a search engine, an online encyclopedia, an expert system, an online library, a knowledge database, an image database, multimedia, a statistical database, an electronic journal, and a map database.

9. The method of claim 1, further comprising determining, based on the subject area associated with the information request, one or more target users of the automated dialog system or one or more external communication services to whom the information request will be forwarded.

10. The method of claim 1, wherein the selection of the one or more answers is further based on one or more of the following: a user feedback, a user rating, an answer rating, user profile information, a user expertise, and an inner rating within the automated dialog system.

11. An automated dialog system, the system comprising:
   a processor;
   a database in communication with the processor, wherein the processor is configured to:
   receive an information request, from a user of the automated dialog system;
   process the information request by a NLP module of the automated dialog system to provide a meaning representation of the information request;
   determine if the information request should be processed by default information sources or non-default information sources;
   if it is determined that the information request should be processed by the default information sources:
      search for an answer in at least one predetermined default information source based on the a meaning representation of the information request; and
      deliver the answer obtained from the at least one predetermined default information source to the user;
   if it is determined that the information request should be processed by the non-default information sources:
      determine a subject area associated with the information request based on the meaning representation;
      based on the determination, forward the information request to one or more information sources;
      select one or more answers from answers received from the one or more information sources, wherein the selection of the one or more answers is based at least in part on the subject area associated with the information request; and
      deliver the selected one or more answers to the user of the automated dialog system.

12. The system of claim 11, wherein the processor is further configured to forward the information request to further users of the automated dialog system.

13. The method of claim 11, wherein the processor is further configured to forward the information request to one or more external communication services.

14. The method of claim 13, wherein the one or more external communication services include one or more of the following: a website, a web blog, a social network, a specialized information request answering service, a forum, a chat room, an email system, a group discount service system, and a crowd-sourced system.

15. The method of claim 13, wherein the processor is further configured to request user permission from the user to forward the information request to the one or more external communication services.

16. The method of claim 11, wherein the one or more answers are delivered in an asynchronous manner by one or more of the following: a push notification, an email, a text message, an instant message, a blog post, a social network message, and a voice message.

17. The method of claim 11, wherein the one or more information sources include one or more of the following: a search engine, an online encyclopedia, an expert system, an online library, a knowledge database, an image database, multimedia, a statistical database, an electronic journal, and a map database.

18. The method of claim 11, wherein the processor is further configured to determine, based on the subject area associated with the information request, one or more target users of the automated dialog system or one or more external communication services to whom the information request will be forwarded.

19. The method of claim 11, wherein the selection of the one or more answers is further based on one or more of the following: a user feedback, a user rating, an answer rating, user profile information, a user expertise, and an inner rating within the chat information automated dialog system.

20. A non-transitory processor-readable medium having instructions stored thereon, which when executed by one or more processors, perform the following operations:
   receive an information request, from a user of the automated dialog system;
   process the information request by a NLP module of the automated dialog system to provide a meaning representation of the information request;
   determine if the information request should be processed by default information sources or non-default information sources;
   if it is determined that the information request should be processed by the default information sources:
      search for an answer in at least one predetermined default information source based on the a meaning representation of the information request; and
      deliver the answer obtained from the at least one predetermined default information source to the user;
   if it is determined that the information request should be processed by the non-default information sources:
      determine a subject area associated with the information request based on the meaning representation;
      based on the determination, forward the information request to one or more information sources;
      select one or more answers from answers received from the one or more information sources, wherein the selection of the one or more answers is based at least in part on the subject area associated with the information request; and
      deliver the selected one or more answers to the user of the automated dialog system.

* * * * *